United States Patent
Brusius et al.

(10) Patent No.: US 9,660,428 B2
(45) Date of Patent: May 23, 2017

(54) FIREPROOF WALL LEAD-THROUGH FOR AN ELECTRICALLY INSULATED CONDUCTOR AND METHOD FOR PRODUCING A FIREPROOF WALL LEAD-THROUGH

(71) Applicant: Siemens Aktiengesellschaft, Munich (DE)

(72) Inventors: Detlef Brusius, Erlangen (DE); Manfred Gronbach, Herzogenaurach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/030,059

(22) PCT Filed: Oct. 20, 2014

(86) PCT No.: PCT/EP2014/072396
§ 371 (c)(1),
(2) Date: Apr. 16, 2016

(87) PCT Pub. No.: WO2015/059070
PCT Pub. Date: Apr. 30, 2015

(65) Prior Publication Data
US 2016/0261099 A1 Sep. 8, 2016

(30) Foreign Application Priority Data
Oct. 22, 2013 (DE) .......................... 10 2013 221 417

(51) Int. Cl.
*H02G 3/04* (2006.01)
*H02G 3/22* (2006.01)
*H02G 3/00* (2006.01)

(52) U.S. Cl.
CPC ......... *H02G 3/0462* (2013.01); *H02G 3/0412* (2013.01); *H02G 3/22* (2013.01); *H02G 3/263* (2013.01)

(58) Field of Classification Search
USPC ............................ 52/221, 220.8; 174/75, 650
See application file for complete search history.

(56) References Cited

U.S. PATENT DOCUMENTS

| 4,109,423 A | 8/1978 | Perrain | |
| 4,264,779 A * | 4/1981 | Rhodes | H02G 3/22 174/483 |

(Continued)

FOREIGN PATENT DOCUMENTS

| CN | 201475504 U | 5/2010 |
| CN | 202474730 U | 10/2012 |

(Continued)

OTHER PUBLICATIONS

3M; Fire Barrier Expantrol Flexible Intumescent Strip (E-FIS); URL:http://multimedia.3m.com/mws/media/2132680/e-fis-product-data-sheet.pdf?&fn=E-FIS Product Data Sheet.pdf&fn=E-FIS Product Data Sheet.pdf; XP055169414; 2002, two pgs.

(Continued)

*Primary Examiner* — William H Mayo, III
*Assistant Examiner* — Krystal Robinson
(74) *Attorney, Agent, or Firm* — Beusse Wolter Sanks & Maire

(57) ABSTRACT

A fireproof wall lead-through for an electrically insulated conductor, having a wall, a wall pipe leading through the wall, an outer sleeve extending through the wall pipe, and a conductor led through the outer sleeve, which conductor is spaced apart from the outer sleeve in an electrically insulating manner, wherein an intumescent material is applied to the outer sleeve and the conductor in the conductor segment (Continued)

of the wall pipe, which intumescent material swells and closes the wall lead-through under the influence of heat.

7 Claims, 3 Drawing Sheets

(56) References Cited

U.S. PATENT DOCUMENTS

| | | | | |
|---|---|---|---|---|
| 4,434,320 | A | * 2/1984 | Klein | F16L 13/004 174/23 R |
| 5,032,690 | A | * 7/1991 | Bloom | H02G 3/22 174/487 |
| 5,174,077 | A | * 12/1992 | Murota | F16L 5/04 52/220.8 |
| 5,334,927 | A | 8/1994 | Widenhorn | |
| 2013/0095275 | A1 | 4/2013 | Munzenberger | |

FOREIGN PATENT DOCUMENTS

| | | |
|---|---|---|
| DE | 102008003120 A1 | 5/2009 |
| EP | 0567773 A2 | 11/1993 |
| GB | 2077382 A | 12/1981 |
| GE | 2077382 A1 | 12/1981 |
| WO | 8402156 A1 | 6/1984 |
| WO | 2012009742 A1 | 1/2012 |

OTHER PUBLICATIONS

CN Office Action dated Mar. 1, 2017, for CN patent application No. 201480058277.8.

* cited by examiner

FIREPROOF WALL LEAD-THROUGH FOR AN ELECTRICALLY INSULATED CONDUCTOR AND METHOD FOR PRODUCING A FIREPROOF WALL LEAD-THROUGH

CROSS REFERENCE TO RELATED APPLICATIONS

This application is the US National Stage of International Application No. PCT/EP2014/072396 filed Oct. 20, 2014, and claims the benefit thereof. The International Application claims the benefit of German Application No. DE 102013221417.0 filed Oct. 22, 2013. All of the applications are incorporated by reference herein in their entirety.

FIELD OF INVENTION

The invention is intended to resolve a general technical issue for the fulfillment of fire protection requirements in power plants, in the field of single-phase-isolated high-voltage links or "generator busducts". A generator busduct is the electrical link between the generator and its associated generator transformers and auxiliaries transformers in power plants. In construction, this electrical link is designed with individual phase isolation, i.e. each of the three conductors/tubular buses (in a 3-phase a.c. system) is independently enclosed within the busduct enclosure (in a coaxial arrangement). Both the conductor tube and the busduct enclosure are constructed of pure 99.5 aluminum. The installed generator busduct runs from the generator through the "turbine hall" in the direction of the transformers in the open air area. Accordingly, the generator busduct passes through/penetrates both the exterior wall of the turbine hall and the "fire-break wall" between the auxiliaries transformer and generator or unit transformer.

BACKGROUND OF INVENTION

The fire-break wall between the transformers, and the exterior wall of the turbine hall, must be compliant with F30, F60 fire protection ratings (30 or 60 minute fire resistance—fire-retardant or highly fire-retardant) and, in some instances, with more stringent requirements. In general, this poses no problems for the execution of the wall, in structural terms. However, the requisite openings for a generator busduct, of height ranging from 800 mm to 1440 mm and of width in excess of 4000 mm, are such that the stipulated fire protection requirements cannot be observed. This is due to the fact that, at a temperature of ≥500° C. in the event of a fire, a generator busduct of aluminum construction which is built-in or embedded in the opening will melt, thereby producing openings in the wall (corresponding to the diameter of the 3-phase-isolated generator busduct enclosure), thus permitting the fire to penetrate from one side of the wall to the other.

In a known form of construction for the protection of the area surrounding the outer shell, it is provided that the opening on either side of the fire-break wall is closed by a double-sided sheet aluminum cladding, whereby a mineral wool filling is also provided between the two metal plates. In place of mineral wool, "fire-break panels" of approximate thickness 20 mm (combined in plurality in a sandwich construction) are also used. However, even in this form of construction, the openings are not completely closed, such that fire protection requirements are not observed.

SUMMARY OF INVENTION

An object of the invention is the proposal of a fireproof wall lead-through and a method for producing a fireproof wall lead-through for a generator busduct which fulfills fire protection requirements for power plant installations.

This object of the invention in respect of a fireproof wall lead-through is fulfilled by the characteristics of the claims.

In accordance therewith, the fireproof wall lead-through for an electrically insulated conductor comprises a wall, a wall pipe extending through the wall, an outer shell extending through the wall pipe and a conductor routed through the outer shell, which is spaced apart from the outer shell in an electrically insulating arrangement. The invention is characterized in that an intumescent material is applied to the outer shell and the conductor in the conductor segment of the wall opening, which swells and closes the wall lead-through under the influence of heat.

The intumescent material is a structural material in the form of a fire-resistant insulator which expands by foaming under the action of heat, thereby increasing 10-20 times in volume and decreasing in density accordingly. The intumescent material is applied at the time of construction of the wall lead-through and, in normal duty at 90° C. to 105° C., is dimensionally stable. In case of fire (e.g. a fire in the transformer) and a consequent rise in temperature in excess of 150° C., the intumescent material expands and closes all the openings in the wall lead-through.

The annular gap between the tubular conductor and the outer shell, the void in the tubular conductor and the annular gap between the outer shell surface and the wall pipe are closed. By the swelling or expansion by foaming of the intumescent material, all structural openings and annular gaps dictated by the generator busduct in the vicinity of the fire-break wall are closed. Accordingly, a fire cannot penetrate from one side of the fire-break wall to the other. The penetration of fire from one side of the wall to the other through gaps in the wall lead-through is thereby prevented. In construction, all three phases of the generator busduct in the vicinity of the wall lead-through are enclosed in the intumescent material according to the invention.

As the maximum temperature of the tubular conductor in normal duty ranges from 90° C. to 105° C., it is extremely important that the intumescent material cladding according to the invention should only expand at a temperature ≥120° C. Swelling would otherwise result in the closure of the requisite in-service air gap of the busduct (the electrical arcing distance between the tubular conductor and the outer shell) to the ground potential, thereby resulting in a line-to-ground fault or double line-to-ground fault and the consequent failure of the power plant unit.

The intumescent material is advantageously applied on the one hand between the wall pipe and the exterior surface of the outer shell, such that the space between the wall pipe and the outer shell is closed by the action of heat, and on the other hand on the interior surface of the outer shell and the exterior surface of the conductor, such that the space between the outer shell and the conductor is closed by the action of heat.

The conductor in a generator busduct is a tubular conductor, which has a hollow interior. In order to ensure the closure of the interior of the tubular conductor in the event of fire, the tubular conductor, in the wall lead-through tube segment, is provided with at least one plate which is perpendicular to the tube axis and is coated with the intumescent material. In the event of fire, said plate expands and closes the interior of the tubular conductor.

The tubular conductor is advantageously provided with two plates, which are mutually spaced, and the respective inward-facing side of which is coated with the intumescent material. Advantageously, the spacing is approximately equivalent to the wall thickness. In the event of fire, the intumescent material coatings expand and combine, thus closing the interior of the tubular conductor.

The intumescent material preferably ranges in thickness from 10 to 25 mm, and is applied in panels. Three 10 mm panels of width 250 mm are preferably applied to the outer surfaces, and one 25 mm panel of width 250 mm is applied to the inner surfaces.

In a specific further development, the intumescent material is applied in panels, and is mechanically secured to the outer surfaces by means of tapes and to the inner surface by means of clamps.

The outer shell in the conductor segment of the wall opening is provided with a larger diameter, and maintains the requisite arcing distance between the conductor and the shell, even after the insertion of the intumescent material.

BRIEF DESCRIPTION OF THE DRAWINGS

Exemplary embodiments of the invention are described in greater detail hereinafter with reference to the drawings. Herein:

FIG. 1 and FIG. 2 show an outer shell and a tubular conductor in the area of the wall lead-through.

DETAILED DESCRIPTION OF INVENTION

Figure 1:
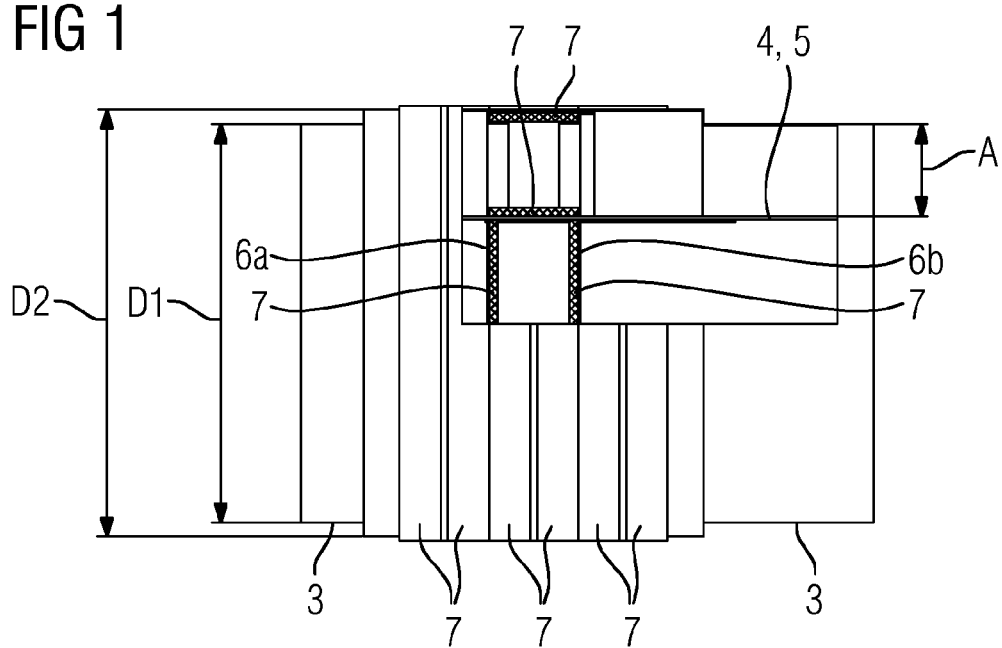
Figure 2:
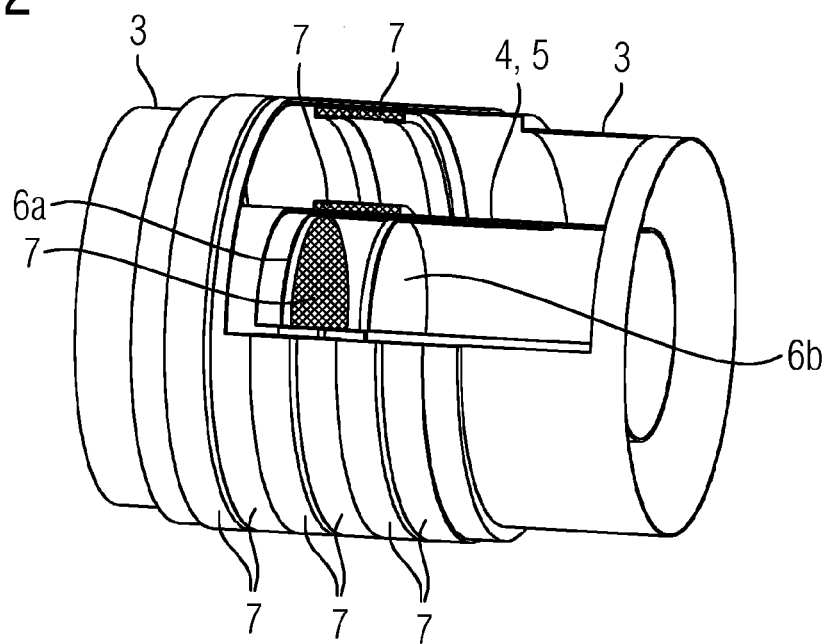
Figure 3:
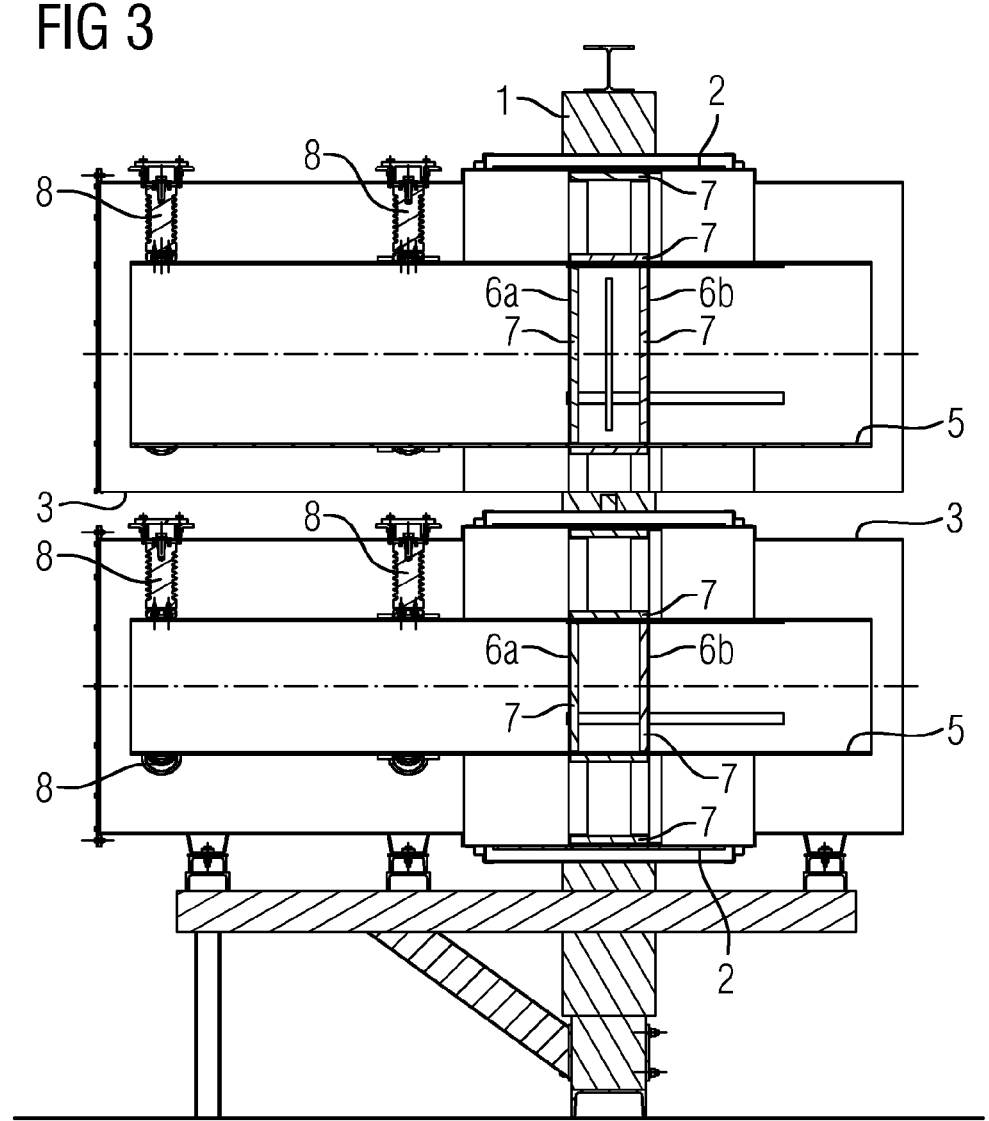
FIG. 3 shows a sectional view of a wall lead-through with an outer shell and an electrically isolated conductor comprising tubular conductors.

FIG. 1 shows a two-dimensional side view of the outer shell 3 of a generator busduct represented three-dimensionally in FIG. 3, for insertion in a wall pipe. The outer shell 3 contains the conductor 4, which is configured as a tubular conductor 5. The clearance A between the outer shell 3 and the tubular conductor 5 is described as the annular gap, and is fundamentally required for the purposes of the voltage withstand of the generator busduct. The annular gap is dictated by structural requirements and, in the present example is 230 mm.

Inside the tubular conductor, two plates 6a and 6b are arranged perpendicularly to the tube axis, respectively coated on their inward-facing sides with an intumescent material 7.

A coating of intumescent material 7 is applied to the outer surface of the tubular conductor 5 and to the inner and outer surface of the outer shell. The outer shell is of diameter D1. In the zone of the inner coating of the intumescent material 7, the diameter D2 is 1-2 times greater than the thickness of the intumescent material. Accordingly, the same annular gap is maintained in the zone of the intumescent coating as in the uncoated segment of the outer shell.

FIG. 3 shows a sectional view of a wall lead-through for a 3-phase generator busduct with a wall pipe 2, an outer shell 3 and a tubular conductor 5 for each phase. The wall lead-through is essentially comprised of a wall 1, the wall pipe 2, the outer shells 3 and the tubular conductors 5. The outer shells 3 are held at a distance from the tubular conductor by insulators. The plates 6a and 6b, which are respectively coated on their inner sides with the intumescent material 7, are arranged in the tubular conductors 5. The clearance between the plates 6a and 6b is approximately equivalent to the thickness of the wall 1. The tubular conductors 5 are provided with an outer coating of the intumescent material 7. The outer shells 3 are also coated on their inner and outer sides with the intumescent material 7.

Figure 4:
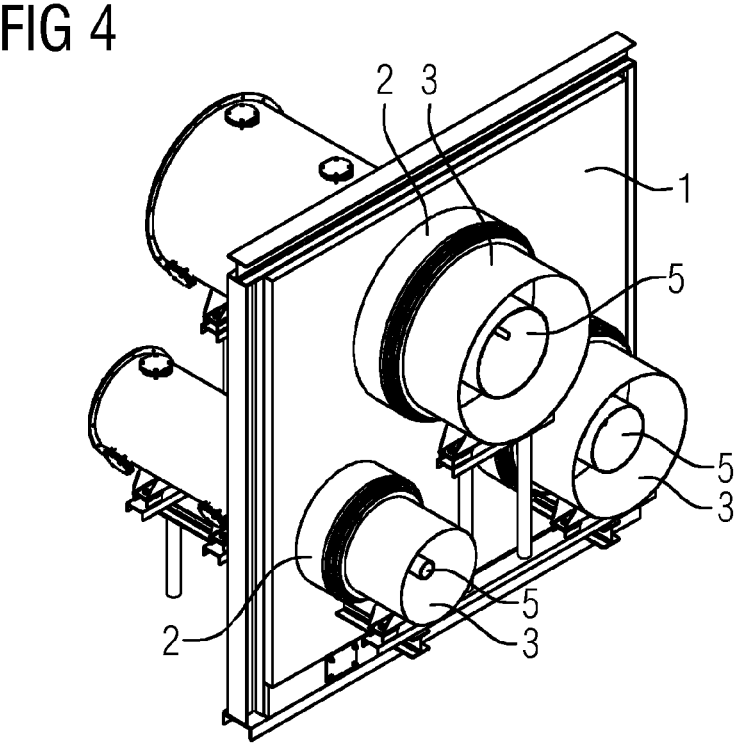
FIG. 4 shows an external view of a wall lead-through with 3 different outer shells and an electrically isolated conductor comprising tubular conductors.

FIG. 4 shows an external view of a wall lead-through with an outer shell 3 and a tubular conductor 5. Various sizes of tubular conductors 5 and outer shells 3 are shown here. However, in a structural embodiment of the invention, all three phases of the generator busduct are configured with outer shells 3 and tubular conductors 5 of equal diameter.

Figure 5:
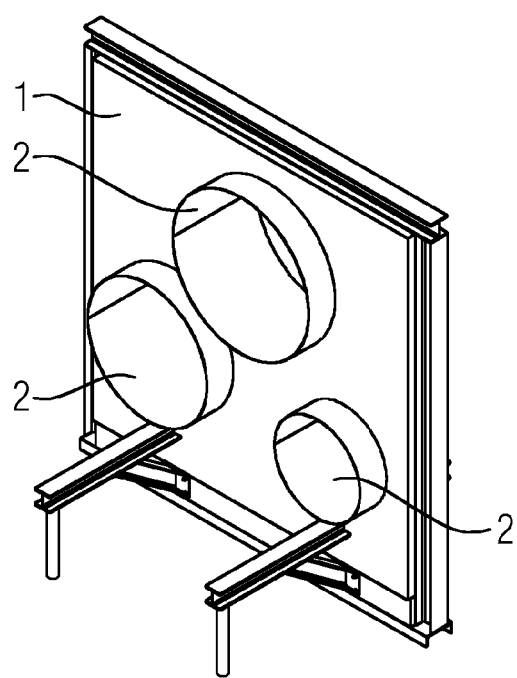
FIG. 5 shows an external view of a wall lead-through with wall pipes fitted.

FIG. 5 shows an external view of a wall lead-through, with a wall 1 and wall pipes 2.

The invention provides a particularly simple technical and structural means for the provision of a high level of fire safety. Only minor adjustments to the standardized components of the generator busduct are required for this purpose. Accordingly, the invention permits the achievement of fire protection requirements in a highly cost-effective manner.

Advantages according to the invention proceed analogously to the fireproof wall lead-through as claimed.

The wall lead-through for a 3-phase-isolated generator busduct is produced by a method wherein, in a first process step, three steel pipes, in particular of approximate length 800 mm are secured in the fire-break wall by means of wall anchor bolts. In a subsequent second process step, intumescent material is applied to the generator busducts on the outer shell, on the inner side of the outer shell, on the outer side of the conductor and on the plates placed in the interior of the conductor perpendicularly to said conductor. In a third process step, the generator busducts are fed through the wall pipes.

Advantageously, between the wall pipe and the outer side of the outer shell of the generator busduct, three courses of intumescent material panels are applied to the outer shell. One course of intumescent material panels is applied to the inner side of the outer shell and the outer side of the conductor respectively. The conductor is closed on its interior by two rounds coated with intumescent material.

The invention claimed is:

1. A fireproof wall lead-through for an electrically insulated conductor, comprising:
   a wall,
   a wall pipe extending through the wall,
   an outer shell extending through the wall pipe,
   a tubular conductor routed through the outer shell, which is spaced apart from the outer shell in an electrically insulating arrangement,
   an intumescent material, wherein the intumescent material is applied to the outer shell and the tubular conductor in a tube segment of the wall pipe, which swells and closes the wall lead-through under the influence of heat, and
   at least two plates arranged inside the tubular conductor and perpendicular to a tube axis, which are mutually spaced, and the respective inward-facing side of which is coated with the intumescent material.

2. The fireproof wall lead-through as claimed in claim 1, wherein the intumescent material is applied to a thickness of 10-25 mm.

3. The fireproof wall lead-through as claimed in claim 1, wherein the intumescent material is applied in panels, and is mechanically secured to an outer surface of the conductor and an outer surface of the outer shell by means of tapes, and to an inner surface of the outer shell by means of clamps.

4. The fireproof wall lead-through as claimed in claim 1, wherein, in the conductor segment of the wall pipe, a diameter of the outer shell is increased by a thickness of the intumescent material relative to a diameter of the outer shell not in the conductor segment.

5. A fireproof wall lead-through for an electrically insulated conductor, comprising:
    a wall pipe configured to extend through a wall,
    an outer shell configured to extend through the wall pipe,
    a tubular conductor routed through the outer shell in a manner effective to form an annular gap between the tubular conductor and the outer shell, and
    a plate disposed within the tubular conductor and positioned perpendicular to a tubular conductor longitudinal axis in a longitudinal segment that coincides with the wall when the lead-through is assembled,
    intumescent material applied to: an outer surface of the outer shell in the longitudinal segment; an inner surface of the outer shell in the longitudinal segment; an outer surface of the conductor in the longitudinal segment; and a side of the plate,
    wherein upon heating the intumescent material applied to the inner surface of the outer shell and the intumescent material applied to the outer surface of the conductor expand into each other to seal the annular gap.

6. The fireproof wall lead-through of claim 5, further comprising:
    a second plate disposed within the tubular conductor and positioned perpendicular to the tubular conductor longitudinal axis in the longitudinal segment,
    intumescent material applied to a side of the second plate,
    wherein the side of the plate and the side of the second plate face each other.

7. The fireproof wall lead-through of claim 5,
    wherein the intumescent material applied to the inner surface of the outer shell and the intumescent material applied to the outer surface are separated by a distance in the longitudinal segment, thereby forming an annular gap in the longitudinal segment;
    wherein the outer surface of the conductor and the inner surface of the outer shell are separated by a distance at a location other than the longitudinal segment, thereby forming an annular gap in the location other than the longitudinal segment;
    wherein an inner diameter of the outer shell increases in the longitudinal segment effect to ensure the distance in the longitudinal segment is the same as the distance in the location other than the longitudinal segment.

* * * * *